United States Patent
Motohashi et al.

(10) Patent No.: US 11,371,171 B2
(45) Date of Patent: Jun. 28, 2022

(54) PRODUCTION METHOD FOR SEPARATED FIBER BUNDLE, SEPARATED FIBER BUNDLE, FIBER-REINFORCED RESIN MOLDING MATERIAL USING SEPARATED FIBER BUNDLE, AND PRODUCTION METHOD FOR FIBER-REINFORCED RESIN MOLDING MATERIAL USING SEPARATED FIBER BUNDLE

(71) Applicant: Toray Industries, Inc., Tokyo (JP)

(72) Inventors: Tetsuya Motohashi, Nagoya (JP); Takafumi Hashimoto, Nagoya (JP); Katsuhiro Miyoshi, Nagoya (JP); Chiasa Sato, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 630 days.

(21) Appl. No.: 16/310,165

(22) PCT Filed: Jun. 6, 2017

(86) PCT No.: PCT/JP2017/020916
§ 371 (c)(1),
(2) Date: Dec. 14, 2018

(87) PCT Pub. No.: WO2017/221688
PCT Pub. Date: Dec. 28, 2017

(65) Prior Publication Data
US 2019/0177887 A1 Jun. 13, 2019

(30) Foreign Application Priority Data

Jun. 22, 2016 (JP) .............................. JP2016-123438
Jun. 22, 2016 (JP) .............................. JP2016-123439

(51) Int. Cl.
B29C 70/54 (2006.01)
D02J 1/18 (2006.01)
(Continued)

(52) U.S. Cl.
CPC ................. *D02J 1/18* (2013.01); *B29B 11/00* (2013.01); *B29B 15/12* (2013.01); *B29B 15/122* (2013.01);
(Continued)

(58) Field of Classification Search
CPC ....... B29C 70/54; B29C 70/545; B29B 15/08; B29B 15/10
See application file for complete search history.

(56) References Cited

U.S. PATENT DOCUMENTS 3,810,805 A * 5/1974 Goldsworthy ........ B29C 70/388
156/361
4,167,130 A * 9/1979 Miller ...................... B26F 1/20
83/866
(Continued)

FOREIGN PATENT DOCUMENTS

EP 2 687 356 A1 1/2014
JP 2002-255448 A 9/2002
(Continued)

*Primary Examiner* — Matthew J Daniels
(74) *Attorney, Agent, or Firm* — DLA Piper LLP (US)

(57) ABSTRACT

A production method for a separated fiber bundle includes at least: [A] a partial separation step for obtaining a partially separated fiber bundle in which separation-processed parts, each separated into a plurality of bundles, and not-separation-processed parts are alternately formed along the lengthwise direction of a fiber bundle comprising a plurality of single fibers; and [B] a cutting step for cutting the not-separation-processed parts of the partially separated fiber bundle formed in the step [A] along the lengthwise direction of the fiber bundle. A separated fiber bundle produced by the method, a fiber-reinforced resin molding material that uses the separated fiber bundle, and a production method for the fiber-reinforced resin molding material.

9 Claims, 9 Drawing Sheets

(51) Int. Cl.
| | |
|---|---|
| *C08J 5/06* | (2006.01) |
| *C08J 5/24* | (2006.01) |
| *B29C 70/02* | (2006.01) |
| *B29B 11/00* | (2006.01) |
| *B29B 15/12* | (2006.01) |
| *B65H 51/005* | (2006.01) |
| *B65H 54/02* | (2006.01) |
| *B65H 73/00* | (2006.01) |

(52) U.S. Cl.
CPC ............ *B29C 70/02* (2013.01); *B29C 70/545* (2013.01); *B65H 51/005* (2013.01); *B65H 54/02* (2013.01); *B65H 73/00* (2013.01); *C08J 5/06* (2013.01); *C08J 5/24* (2013.01); *C08J 2323/12* (2013.01); *C08J 2331/02* (2013.01); *C08J 2333/04* (2013.01); *C08J 2361/10* (2013.01); *C08J 2363/00* (2013.01); *C08J 2377/00* (2013.01); *C08J 2381/04* (2013.01)

(56) References Cited

U.S. PATENT DOCUMENTS

| | | | | |
|---|---|---|---|---|
| 4,207,282 A * | 6/1980 | Grisch | ............... | B29C 70/00 264/257 |
| 4,992,127 A * | 2/1991 | Kishi | ............... | B29B 15/08 156/182 |
| 5,177,039 A * | 1/1993 | Allaire | ............... | C04B 35/195 501/95.2 |
| 6,454,893 B1 * | 9/2002 | McKague, Jr. | ......... | B29C 70/12 156/166 |
| 6,838,148 B1 * | 1/2005 | Ehnert | ............... | B29C 43/34 428/109 |
| 7,354,540 B2 * | 4/2008 | Brussel | ............... | B29C 70/50 264/113 |
| 2006/0073311 A1 * | 4/2006 | Hogg | ............... | B29C 70/386 428/174 |
| 2010/0028593 A1 * | 2/2010 | Taketa | ............... | B32B 3/266 428/113 |
| 2011/0036481 A1 * | 2/2011 | Inserra Imparato | ..... | C08J 11/04 156/94 |
| 2011/0140299 A1 * | 6/2011 | Huang | ............... | B26D 3/08 264/137 |
| 2012/0213997 A1 | 8/2012 | Wang et al. | | |

FOREIGN PATENT DOCUMENTS

| | | |
|---|---|---|
| JP | 2004-100132 A | 4/2004 |
| JP | 2008-254191 A | 10/2008 |
| JP | 2011-241494 A | 12/2011 |
| JP | 2013-049208 A | 3/2013 |
| JP | 2014-030913 A | 2/2014 |
| JP | 5512908 B1 | 4/2014 |
| WO | 2012/105080 A1 | 8/2012 |
| WO | 2014/007389 A1 | 1/2014 |
| WO | 2014/021315 A1 | 2/2014 |

* cited by examiner (A)

(B)

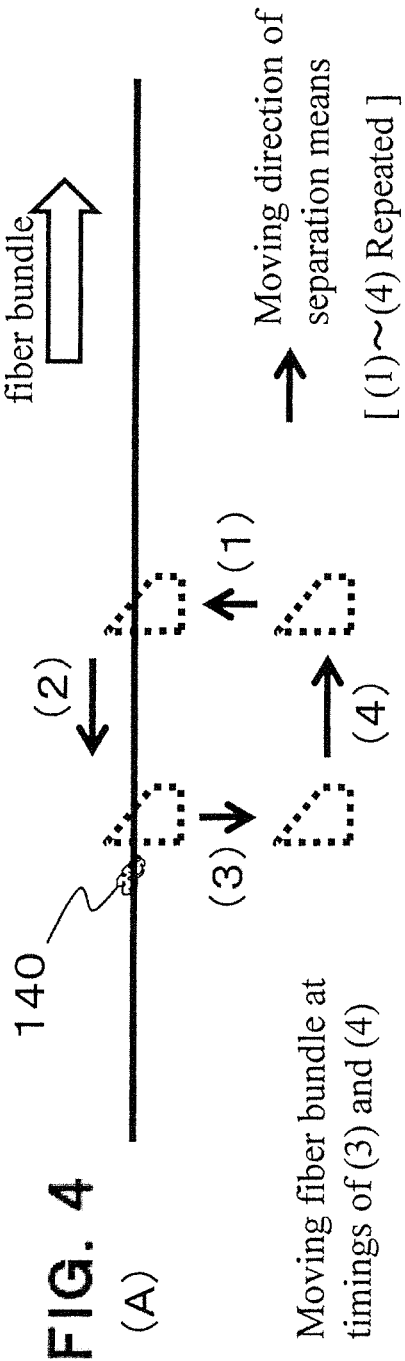
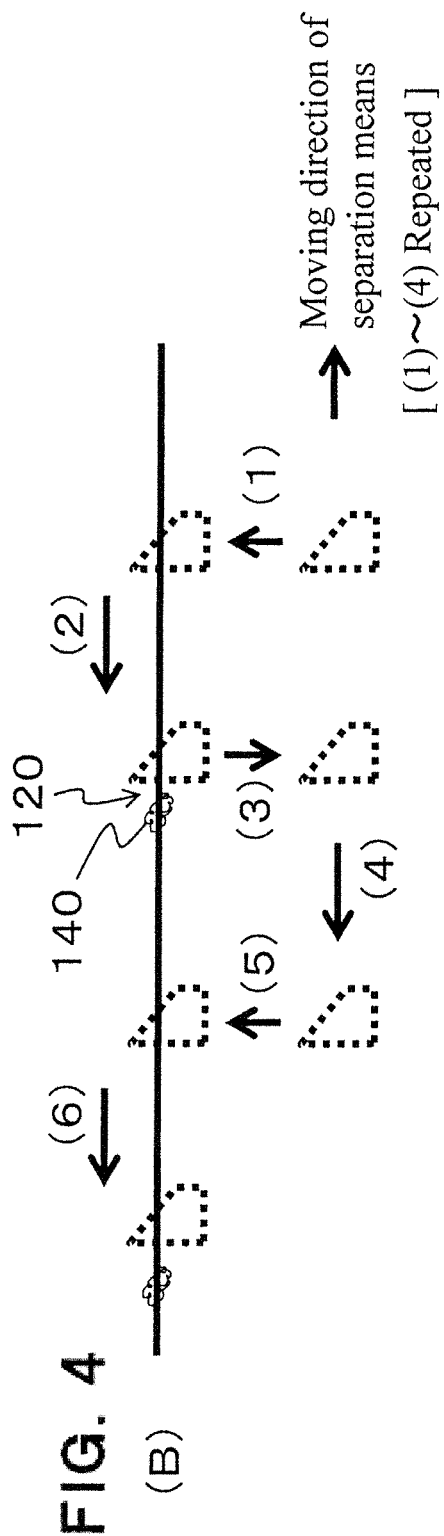

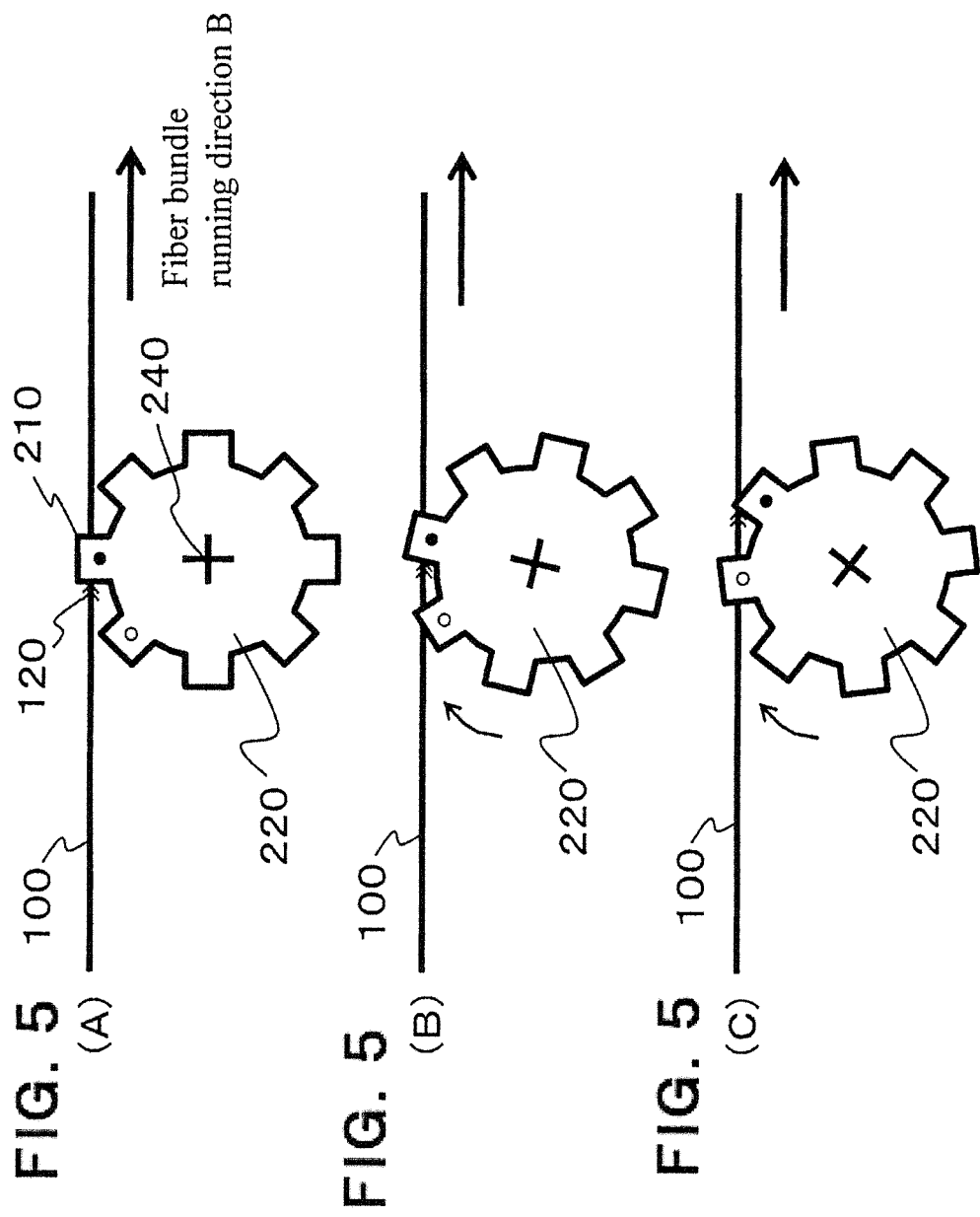

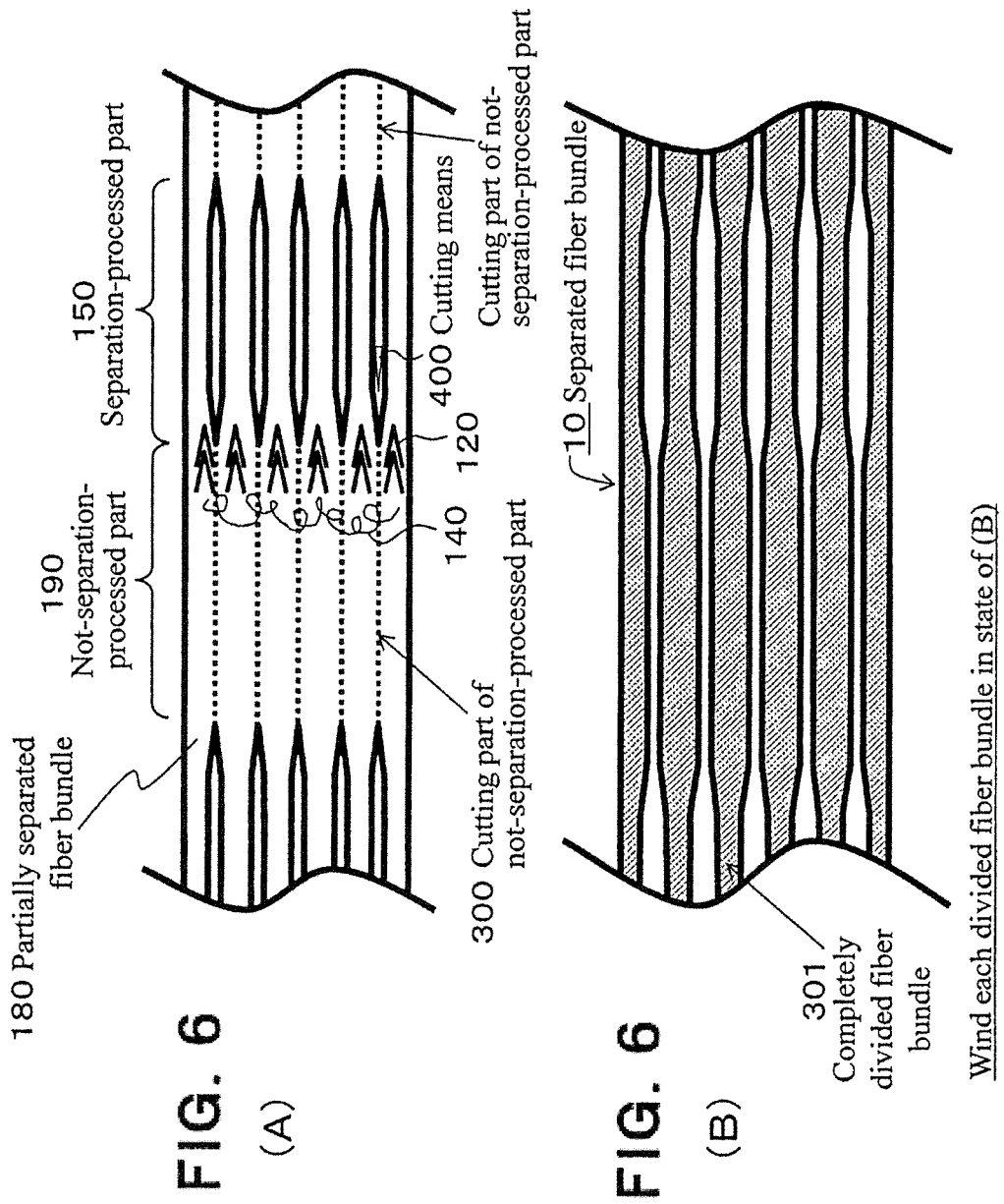

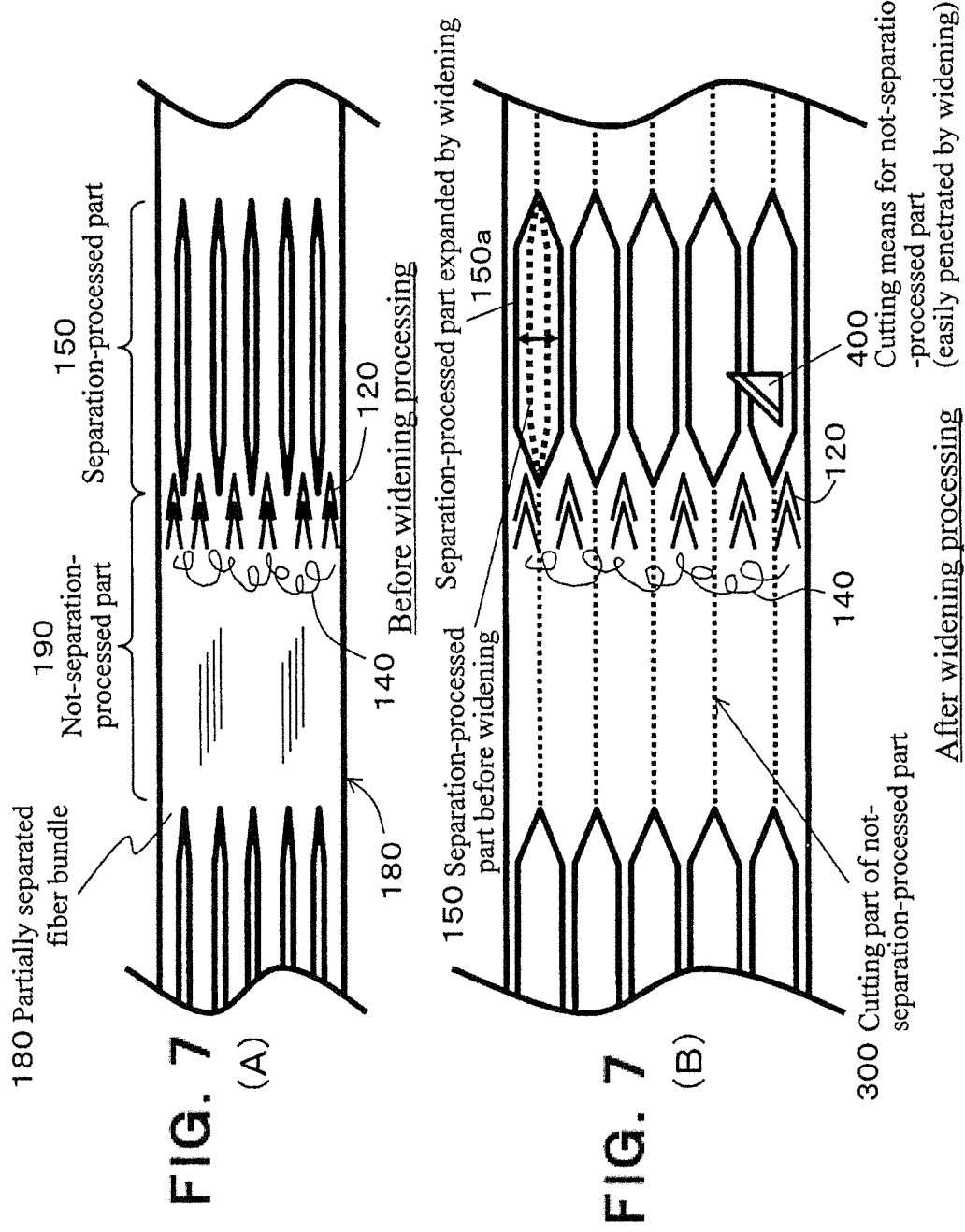

PRODUCTION METHOD FOR SEPARATED FIBER BUNDLE, SEPARATED FIBER BUNDLE, FIBER-REINFORCED RESIN MOLDING MATERIAL USING SEPARATED FIBER BUNDLE, AND PRODUCTION METHOD FOR FIBER-REINFORCED RESIN MOLDING MATERIAL USING SEPARATED FIBER BUNDLE

TECHNICAL FIELD

This disclosure relates to a method of producing a separated fiber bundle and a separated fiber bundle and, more specifically, to a production method for a separated fiber bundle having a high bundle shape retention property, wherein a partial separation processing enabling to continuously separate an inexpensive large tow having a large number of single fibers that is not expected with separation without causing yarn breakage is performed first, and then the partially separated fiber bundle is processed into completely divided fiber bundles, a separated fiber bundle produced by the method, and a fiber-reinforced resin molding material using the separated fiber bundle and a production method thereof.

BACKGROUND

A technology that produces a molded article having a desired shape is known in which a molding material comprising a bundle-like aggregate of discontinuous reinforcing fibers (for example, carbon fibers) (hereinafter, also referred to as a fiber bundle) and a matrix resin is used and it is molded by heating and pressurizing. In such a molding material, a molding material comprising a fiber bundle having a large number of single fibers is excellent in flowability at the time of molding, but tends to be inferior in mechanical properties of a molded article. On the other hand, a fiber bundle adjusted to an arbitrary number of single fibers is used as a fiber bundle in the molding material, aiming to satisfy both flowability at the time of molding and mechanical properties of the molded article.

As a method of adjusting the number of single fibers of the fiber bundle, for example, JP-A-2002-255448 and JP-A-2004-100132 disclose methods of performing a separation processing using a plurality of fiber bundle winding bodies prepared by winding a plurality of fiber bundles in advance. In those methods, however, because the number of single fibers of each fiber bundle treated in advance is restricted, the adjustment range is limited and, therefore, it is difficult to adjust to a desired number of single fibers.

Further, for example, JP-A-2013-49208, JP-A-2014-30913 and Japanese Patent No. 5512908 disclose methods of longitudinally slitting a fiber bundle to a desired number of single fibers by using disk-shaped rotary blades. In those methods, although it is possible to adjust the number of single fibers by changing the pitch of the rotary blades, since the fiber bundle longitudinally slit over the entire length in the lengthwise direction has no convergence property, the yarn after the longitudinal slit tends to become difficult in handling such as winding it on a bobbin or unwinding the fiber bundle from the bobbin. In addition, when conveying the fiber bundle after the longitudinal slitting, the split end-like fiber bundle generated by the longitudinal slit may be wrapped around a guide roll, a feed roll or the like, which may not be easy to convey.

Further, WO 2012/105080 discloses a method of cutting a fiber bundle to a predetermined length at the same time as a longitudinal slit by a separation cutter having a lateral blade perpendicular to the fiber direction in addition to a longitudinal blade having a longitudinal slit function in a direction parallel to the fiber direction. According to that method, it becomes unnecessary to once wind the fiber bundle after the longitudinal slit to the bobbin and transport it, and the handling property is improved. However, since the separation cutter has the longitudinal blade and the lateral blade, when one of the blades reaches the cutting life first, an obstacle arises that the entire blade has to be exchanged.

Further, for example, JP-A-2011-241494 and US Patent Publication No. 2012/0213997 A1 describe a method in which a roll having a plurality of projections is provided on the outer circumferential surface of the roll, and the projections of the roll is pushed into a fiber bundle to partially separate the fiber bundle. In that method, however, because the circumferential speed of the roll and the conveying speed of the fiber bundle are basically the same speed synchronized with each other, it is impossible to control the lengths and the like of the separated-processed section and the not-separated-processed section, and it is difficult to obtain a partially separated fiber bundle with an optimal form.

Furthermore, EP-A-2687356 A1 describes a special method of forming intermittently extending flow paths to facilitate resin impregnation in a fiber bundle by a monofilament extending in a direction orthogonal to the fiber bundle. However, this manner relates to a technology that forms a flow path to facilitate resin impregnation in a fiber bundle and, therefore, it is basically a technology different from separation of a fiber bundle such as large tow.

As described above, to satisfy both the flowability during molding and the mechanical properties of a molded article, a fiber bundle adjusted to an arbitrary optimal number of single fibers is required. However, when a fiber bundle formed as a large tow is continuously longitudinally slit abruptly by a slitter or the like and a separation processing is performed thereto, process trouble may be caused such as when a split end-like fiber bundle generated by the slit may be wrapped around various rolls, or when the yarn itself may be cut and a yarn breakage may be caused and, therefore, stability of the processing step is poor.

Furthermore, in passing through the above-described longitudinal slitting process at a state where a fiber bundle is twisted such as twist exists in the fiber bundle itself or twist occurs during traveling of the fiber bundle at the separation step, because crossing fiber bundles are cut in the lengthwise direction, a problem occurs in that the fiber bundle is cut at a small length before and after the longitudinal slitting process and the longitudinal slitting cannot be continuously performed.

Accordingly, it could be helpful to provide a method of producing a separated fiber bundle capable of producing a separated fiber bundle capable of forming a fiber bundle with an optimal number of single fibers to manufacture a molding material used for molding a composite material, efficiently and smoothly with excellent process stability and high productivity. In particular, it could be helpful to provide a method of producing a separated fiber bundle capable of manufacturing a separated fiber bundle enabling a continuous slitting without concerning about the exchange life or the like of a cutting blade even in case of a fiber bundle including twist or a fiber bundle formed as a large tow having a large number of single fibers, further capable of manufacturing a separated fiber bundle having a high bundle shape retention property, and a separated fiber bundle produced by the method.

Further, it could be helpful to provide a fiber-reinforced resin molding material in which the above-described separated fiber bundle is matted and impregnated with a resin, and a method of producing a fiber-reinforced resin molding material having a series of steps up to manufacture it.

SUMMARY

We thus provide:
(1) A method of producing a separated fiber bundle, comprising at least the following steps [A] and [B]:
  [A] a partial separation step for obtaining a partially separated fiber bundle in which separation-processed parts, each separated into a plurality of bundles, and not-separation-processed parts are alternately formed along the lengthwise direction of a fiber bundle comprising a plurality of single fibers; and
  [B] a cutting step for cutting the not-separation-processed parts of the partially separated fiber bundle formed in the step [A] along the lengthwise direction of the fiber bundle.
(2) The method of producing a separated fiber bundle according to (1), wherein in the step [B], over the entire length of a not-separation-processed part located between ends of the separation-processed parts adjacent to each other in the lengthwise direction of the partially separated fiber bundle formed in the step [A], the not-separation-processed part is cut along the lengthwise direction of the fiber bundle.
(3) The method of producing a separated fiber bundle according to (1) or (2), wherein in the step [A], the partially separated fiber bundle is obtained such that, while a fiber bundle comprising a plurality of single fibers is traveled along the lengthwise direction of the fiber bundle, a separation means provided with a plurality of projected parts is penetrated into the fiber bundle to create a separation-processed part, and entangled parts, where the single fibers are interlaced, are formed at contact parts with the projected parts in at least one separation-processed part, thereafter the separation means is removed from the fiber bundle, and after passing through an entanglement accumulation part including the entangled parts, the separation means is penetrated again into the fiber bundle.
(4) The method of producing a separated fiber bundle according to (1) or (2), wherein in the step [A], the partially separated fiber bundle is obtained such that a separation means provided with a plurality of projected parts is penetrated into a fiber bundle comprising a plurality of single fibers, while the separation means is traveled along the lengthwise direction of the fiber bundle, a separation-processed part is created, and entangled parts, where the single fibers are interlaced, are formed at contact parts with the projected parts in at least one separation-processed part, thereafter the separation means is removed from the fiber bundle, and after the separation means is traveled up to a position passing through an entanglement accumulation part including the entangled parts, the separation means is penetrated again into the fiber bundle.
(5) The method of producing a separated fiber bundle according to any one of (1) to (4), wherein in the step [B], after performing a widening processing to the partially separated fiber bundle, the not-separation-processed part is cut along the lengthwise direction of the fiber bundle.
(6) The method of producing a separated fiber bundle according to any one of (1) to (5), further comprising the following step [C]:
  [C] a winding step of winding a separated fiber bundle completely separated in the step [B].
(7) A separated fiber bundle obtained by the production method according to any one of (1) to (6).
(8) A fiber-reinforced resin molding material comprising a reinforcing fiber mat obtained by cutting the separated fiber bundle according to (7) in a direction crossing the separated fiber bundle and spraying the cut fiber bundles, and a matrix resin.
(9) The fiber-reinforced resin molding material according to (8), wherein the matrix resin is a thermosetting resin.
(10) The fiber-reinforced resin molding material according to (8) or (9), wherein the fiber-reinforced resin molding material is a sheet molding compound.
(11) A method of producing a fiber-reinforced resin molding material according to any one of (8) to (10), comprising at least the following steps [X] to [Z]:
  [X] a separation step of obtaining a separated fiber bundle by alternately forming separation-processed parts, each separated into a plurality of bundles, and not-separation-processed parts along a lengthwise direction of a reinforcing fiber bundle comprising a plurality of single fibers to obtain a partially separated fiber bundle, and thereafter, cutting the not-separation-processed parts along the lengthwise direction of the fiber bundle;
  [Y] a matting step of obtaining a reinforcing fiber mat by cutting the separated fiber bundle in a direction crossing the separated fiber bundle and spraying the cut fiber bundles; and
  [Z] a resin impregnation step of impregnating a matrix resin into the reinforcing fiber mat.
(12) The method of producing a fiber-reinforced resin molding material according to (11), wherein the separated fiber bundle in the step [Y] is obtained by once winding the separated fiber bundle obtained in the step [X] and then unwinding.
(13) The method of producing a fiber-reinforced resin molding material according to (11), wherein at least the steps [X] to [Z] are carried out continuously in a single process.
(14) The method of producing a fiber-reinforced resin molding material according to any one of (11) to (13), wherein in the step [Y], the separated fiber bundle is cut at an angle θ (0<θ≤90°) with respect to the lengthwise direction thereof.

In the method of producing a separated fiber bundle, since the partial separation processing is first performed and the partially separated fiber bundle first performed with the partial separation processing is cut into completely divided fiber bundles (additional separation processing is performed), it becomes possible to suppress the cutting processing in the cutting step to a minimum, and as compared to when in the conventional technologies where a separation processing is performed by longitudinally slitting a fiber bundle of a large tow abruptly and continuously using a slitter or the like, the risk of occurrence of process troubles and the frequency of exchange of a cutting blade can be reduced, whereby the productivity can be greatly improved.

Further, although generally the fiber bundle which has been separated is lowered in convergence and easily dispersed compared to before the separation, in the separated fiber bundle obtained by our method, it becomes possible that the entangled parts (not-separated parts) generated in the first performed partial separation processing can play the role of adhesion point with respect to the separated fiber bundle after the separation processing including the cutting processing, and the retention property of the bundle shape can be kept to be high. Therefore, also from this viewpoint, an excellent process stability and a high productivity can be obtained.

Further, in the fiber-reinforced resin molding material, because of containing a reinforcing fiber mat obtained by cutting and spraying the separated fiber bundle obtained with the above-described excellent process stability and high productivity, and a matrix resin, in molding the cut fiber bundles can be distributed easily at an optimal form, and the flowability during molding and the mechanical properties of a molded article can be exhibited at a good balance.

Furthermore, in the method of producing a fiber-reinforced resin molding material, it becomes possible to perform a series of steps [X] to [Z] continuously in a single process, and a desired fiber-reinforced resin molding material can be produced efficiently and smoothly, in addition, with an excellent productivity.

BRIEF DESCRIPTION OF THE DRAWINGS

FIGS. 4A and 4B show schematic explanatory views showing another example of a movement cycle in which a moving separation means is penetrated into a fiber bundle.

FIGS. 5A-5C are explanatory diagrams showing an example of a movement cycle in which a rotatable separation means is penetrated.

FIGS. 6A and 6B show an example of a cutting step, and shows (A) a schematic plan view of a partially separated fiber bundle and (B) a schematic plan view of a separated fiber bundle manufactured from the partially separated fiber bundle by a cutting step.

FIGS. 7A and 7B show an example of an example of when a widening processing is performed in the method, and shows (A) a schematic plan view of a partially separated fiber bundle before the widening processing and (B) a schematic plan view of the partially separated fiber bundle after the widening processing and before a cutting processing.

EXPLANATION OF SYMBOLS

Figure 1:
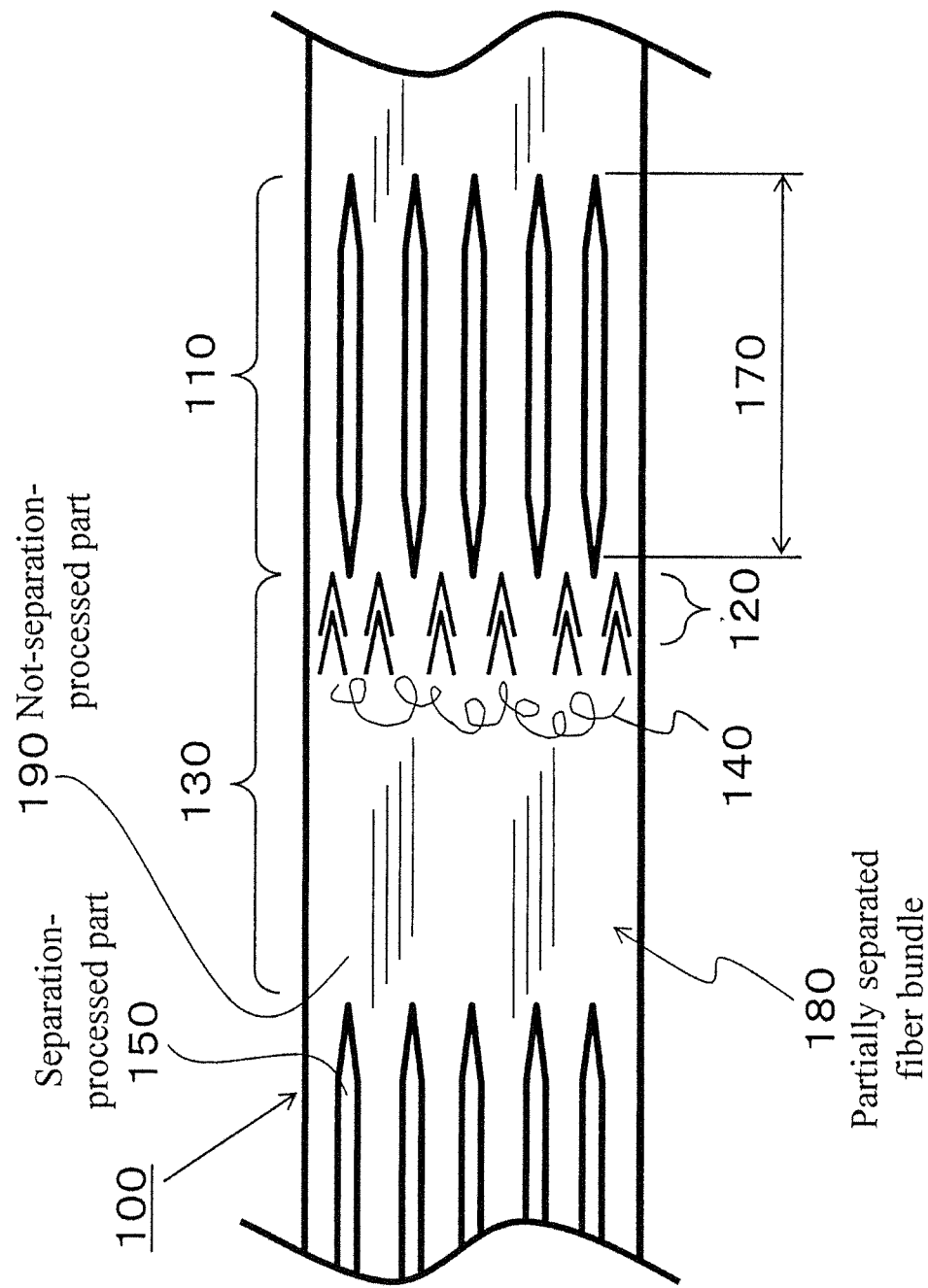
FIG. 1 is a schematic plan view showing an example of a partially separated fiber bundle performed with separation processing to a fiber bundle.

1: process for producing fiber-reinforced resin molding material
2: separation step [X]
3: matting step [Y]
4: resin impregnation step [Z]
5: creel
6: reinforcing fiber bundle
6a: reinforcing fibers
7: cutter unit
7a: cutting blade
8a: spraying mechanism
8b: reinforcing fiber mat
8c: thermosetting resin
9: film
10: separated fiber bundle
11: belt
12: resin impregnation roller
13: fiber-reinforced resin molding material
100: fiber bundle
110: separation-processed section
120: entanglement accumulation part
130: not-separation-processed section
140: fluff accumulation
150: separation-processed part
150a: separation-processed part expanded by widening
160: entangled part
170: separation distance
180: partially separated fiber bundle
190: not-separation-processed part
200: separation means
210: projected part
211: contact part
220: rotatable separation means
240: rotation shaft
300: cutting part of not-separation-processed part
301: completely divided fiber bundle
400: cutting means

DETAILED DESCRIPTION

Hereinafter, examples of a method of producing a separated fiber bundle will be explained referring to figures. This disclosure is not limited in any way to the examples in the drawings.

The method of producing a separated fiber bundle comprises the steps of: [A] a partial separation step of obtaining a partially separated fiber bundle in which separation-processed parts, each separated into a plurality of bundles, and not-separation-processed parts are alternately formed along the lengthwise direction of a fiber bundle comprising a plurality of single fibers; and [B] a cutting step of cutting the not-separation-processed parts of the partially separated fiber bundle formed in the step [A] along the lengthwise direction of the fiber bundle. First, the partial separation step [A] will be explained.

Figure 2:
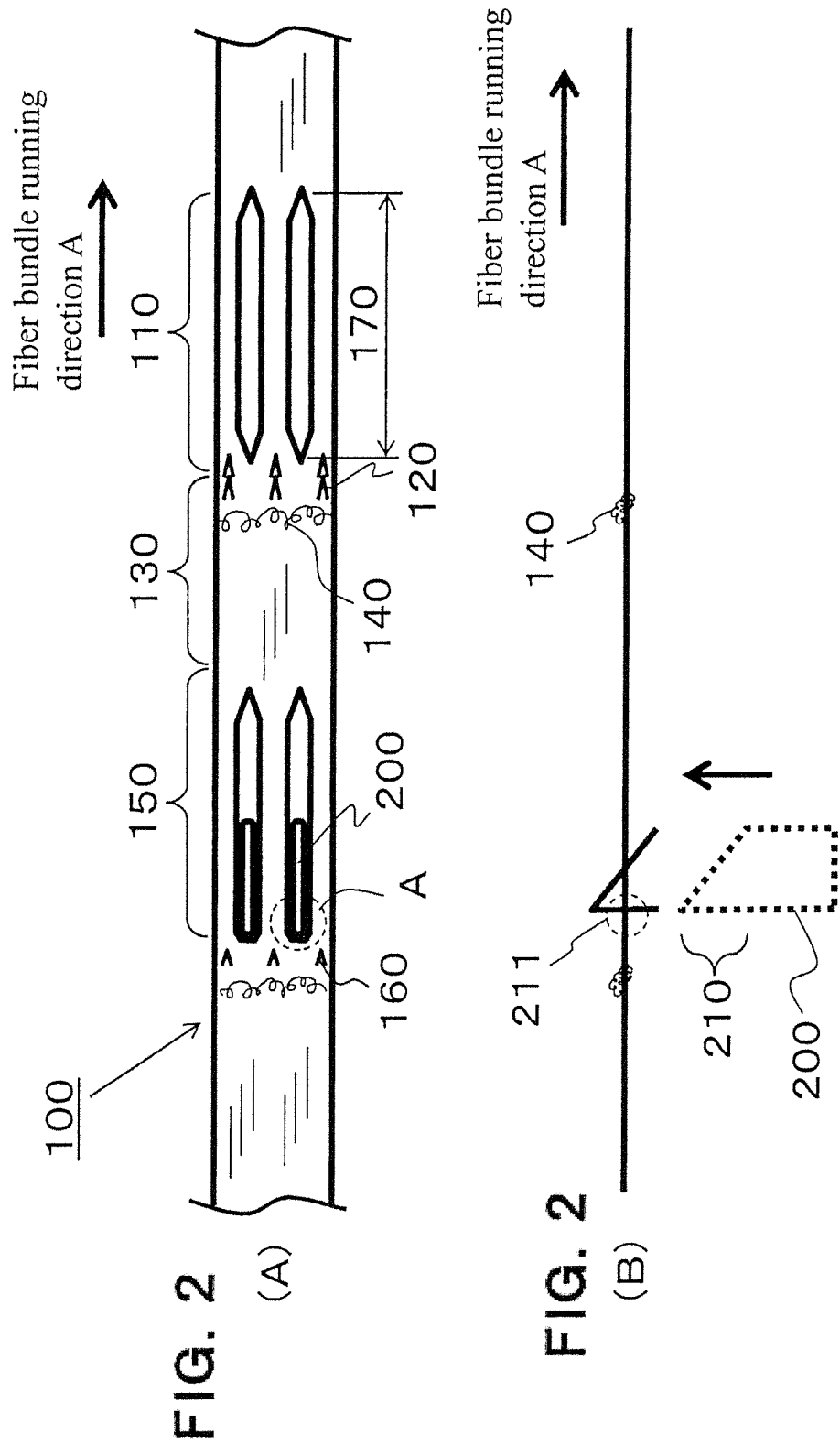
FIGS. 2A and 2B show (A) a schematic plan view and (B) a schematic side view, showing an example in which a separation means is penetrated into a traveling fiber bundle to manufacture a partially separated fiber bundle.

FIG. 1 shows an example of a partially separated fiber bundle performed with a partial separation processing to a fiber bundle, and FIG. 2 shows an example of the partial separation processing. The production of this partially separated fiber bundle will be explained using FIG. 2. FIG. 2 shows (A) a schematic plan view and (B) a schematic side view, showing an example in which a separation means (partial separation means) is penetrated into a traveling fiber bundle. In the figure, a fiber bundle running direction A (arrow) is the lengthwise direction of a fiber bundle 100, which shows that the fiber bundle 100 is continuously supplied from a fiber bundle supply device not shown in the figure.

The separation means 200 is provided with a projected part 210 having a projecting shape which is easy to be penetrated into the fiber bundle 100, and is penetrated into the traveling fiber bundle 100 to create a separation-processed part 150 approximately parallel to the lengthwise direction of the fiber bundle 100. It is preferred that the separation means 200 is penetrated in a direction along the side surface of the fiber bundle 100. The side surface of the fiber bundle means a surface in the vertical direction in a sectional end when the section of the fiber bundle is a flat shape such as a laterally elongated elliptical shape or a laterally elongated rectangular shape (for example, corresponding to the side surface of the fiber bundle 100 shown in FIG. 2). Further, the number of projected parts 210 to be provided may be one for each single separation means 200 or may be plural. When there are a plurality of projected parts 210 in one separation means 200, because the abrasion frequency of the projected part 210 decreases, it becomes possible to reduce the frequency of exchange. Furthermore, it is also possible to simultaneously use a plurality of separation means 200 depending upon the number of fiber bundles to be separated. It is possible to arbitrarily dispose a plurality of projected parts 210 by arranging a plurality of separation means 200 in parallel, staggeringly, in shifted phases or the like.

When the fiber bundle 100 comprising a plurality of single fibers is divided into separated bundles with a smaller number of fibers by the separation means 200, since the plurality of single fibers are substantially not aligned in the fiber bundle 100 but there are many portions interlaced at the single fiber level, entangled parts 160, in which the single fibers are interlaced in the vicinity of the contact parts 211 during the separation processing, may be formed.

"Forming the entangled part 160" means, for example, forming (moving) the entanglement of single fibers with each other, which has been previously present in the separation-processed section, on the contact part 211 by the separation means 200, a case of forming (producing) an aggregate, in which single fibers are newly interlaced, by the separation means 200, and the like.

After creating the separation-processed part 150 in an arbitrary range, the separation means 200 is removed from the fiber bundle 100. By this removal, a separation-processed section 110 performed with separation processing is created, and at the same time as that, the entangled parts 160 created as described above are accumulated in the end portion of the separation-processed section 110, and an entanglement accumulation part 120 accumulated with the entangled parts 160 is created. Further, fluffs generated from the fiber bundle during the separation processing are formed as a fluff accumulation 140 near the entanglement accumulation part 120 at the time of the separation processing.

Thereafter, by penetrating the separation means 200 into the fiber bundle 100 again, the not-separation-processed section 130 formed by a not-separation-processed part 190 is created and a partially separated fiber bundle 180 is formed in which the separation-processed sections 110 and the not-separation-processed sections 130 are disposed alternately along the lengthwise direction of the fiber bundle 100.

As the length of each section, the length of the above-described separation-processed section 110 is preferably 30 mm or more and 1,500 mm or less, and the length of the above-described not-separation-processed section 130 is preferably 1 mm or more and 150 mm or less. In such a range, it is possible to suppress a mis-cutting in the later cutting step of the not-separation-processed section, and stably obtain the separated fiber bundle. If the length of the separation-processed section is too short or the length of not-separation-processed section is too long, there is a possibility that a mis-cutting in which the fiber bundle itself is cut in the cutting step of the not-separation-processed section occurs, thereby causing a yarn breakage. On the other hand, if the length of the separation-processed section is too long or the length of the not-separation-processed section is too short, there is a possibility that the formed entangled part and the entanglement accumulation part are enlarged and the not-separation-processed section cannot be well cut.

The running speed of the fiber bundle 100 is preferably a stable speed with little fluctuation, more preferably a constant speed.

The separation means 200 is not particularly limited as long as the desired result can be achieved, and it is preferable to have a shape like a sharp shape such as a metal needle or a thin plate. As the separation means 200, it is preferred that a plurality of separation means 200 are provided in the width direction of the fiber bundle 100 which is performed with the separation processing, and the number of separation means 200 can be arbitrarily selected depending upon the number of single fibers F forming the fiber bundle 100 to be carried out with the separation processing. It is preferred that the number of separation means 200 is (F/10,000−1) or more and less than (F/50−1) with respect to the width direction of the fiber bundle 100. If it is less than (F/10,000−1), improvements in mechanical properties are hardly exhibited when a reinforcing fiber composite material is made in a later step, and if it is (F/50−1) or more, there is a possibility of yarn breakage or fluffing during the separation processing.

The fiber bundle 100 is not particularly limited in fiber kind as long as it is a fiber bundle comprising a plurality of single fibers. In this connection, it is preferred to use reinforcing fibers, and in particular, the kind thereof is preferably at least one selected from the group consisting of carbon fibers, aramide fibers and glass fibers. These may be used solely, or two or more of them can be used together. Among those, carbon fibers are particularly preferable because it is possible to provide a composite material light in weight and excellent in strength. As the carbon fibers, any one of PAN type and pitch type may be used, and the average fiber diameter thereof is preferably 3 to 12 μm, and more preferably 6 to 9 μm.

In carbon fibers, usually, a fiber bundle obtained by bundling about 3,000 to 60,000 single fibers made of continuous fibers is supplied as a wound body (package) wound around a bobbin. Although it is preferred that the fiber bundle is untwisted, it is also possible to use a twisted strand, and it is applicable even if twisting occurs during conveyance. There is no restriction on the number of single fibers, and when a so-called large tow having a large number of single fibers is used, since the price per unit weight of the fiber bundle is inexpensive, as the number of single fibers increases, the cost of the final product can be reduced, and such a condition is preferred. Further, as a large tow, a so-called doubling form in which fiber bundles are wound together in a form of one bundle may be employed.

When reinforcing fibers are used, it is preferred that they are surface treated for the purpose of improving the adhesive property with a matrix resin used when made to a reinforcing fiber composite material. As the method for the surface treatment, there are an electrolytic treatment, an ozone treatment, a ultraviolet treatment and the like. Further, a sizing agent may be applied for the purpose of preventing fluffing of the reinforcing fibers, improving convergence property of the reinforcing fiber strand, improving adhesive property with the matrix resin and the like. As the sizing agent, though not particularly limited, a compound having a functional group such as an epoxy group, a urethane group, an amino group, a carboxyl group or the like can be used, and as such a compound, one type or a combination of two or more types may be used.

The fiber bundle is preferably in a state of being bundled in advance. "The state being bundled in advance" indicates, for example, a state in which the single fibers forming the fiber bundle are bundled by entanglement with each other, a state in which the fibers are converged by a sizing agent applied to the fiber bundle, or a state in which the fibers are converged by twist generated in a process of manufacturing the fiber bundle.

Figure 3:
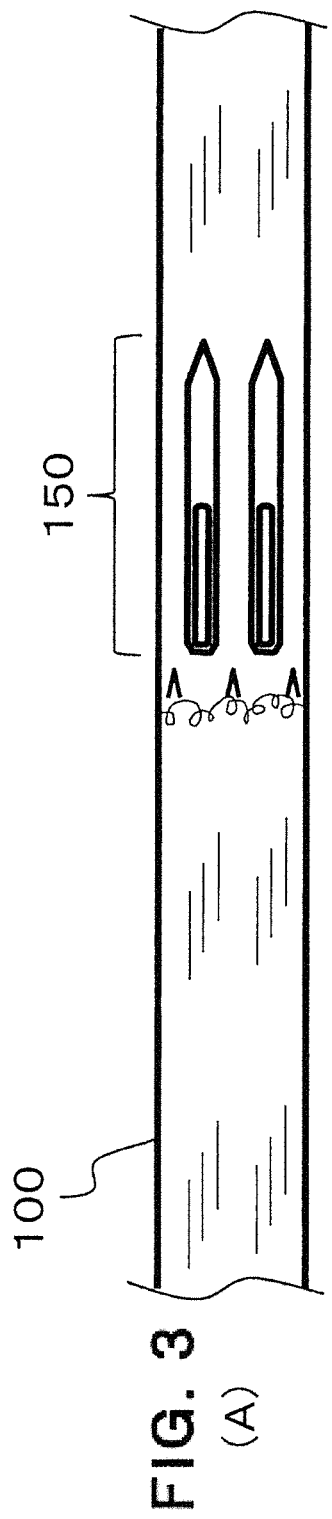
FIGS. 3A and 3B show (A) a schematic plan view and (B) a schematic side view, showing an example of a movement cycle in which a moving separation means is penetrated into a fiber bundle.
Figure 3:
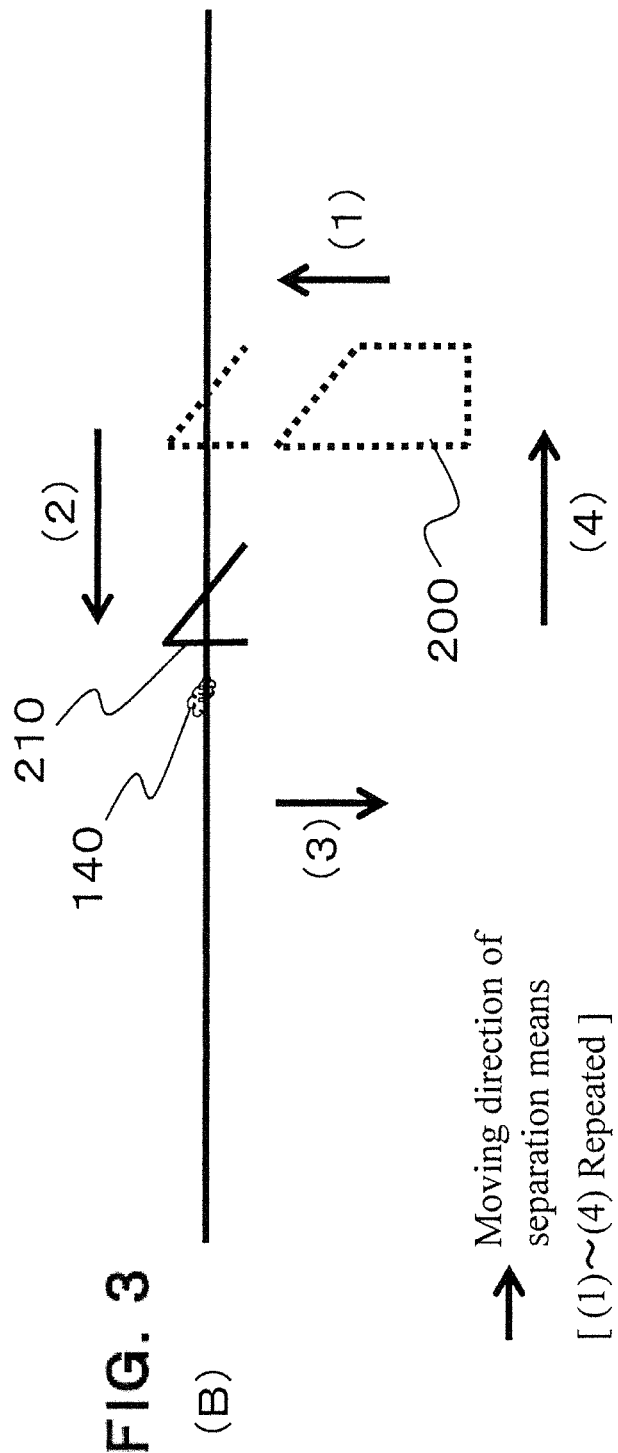

In the partial separation step, it is not limited to when the fiber bundle travels, and as shown in FIG. 3, a method may be also employed wherein the separation means 200 is penetrated into the fiber bundle 100 being in a stationary state (arrow (1)), then, while the separation means 200 is traveled along the fiber bundle 100 (arrow (2)), the separation-processed part 150 is created, and thereafter, the separation means 200 is removed (arrow (3)). Thereafter, as shown in FIG. 4(A), the separation means 200 may be returned to the original position (arrow (4)) after the fiber bundle 100 having been in a stationary state is moved by a constant distance at timings shown by arrows (3) and (4), or as shown in FIG. 4(B), without moving the fiber bundle 100, the separation means 200 may be traveled until it passes through the entanglement accumulation part 120 (arrow (4)).

When the fiber bundle 100 is subjected to separation processing while it is moved by a constant distance, as shown in FIG. 3(B) or FIG. 4(A), the control is performed in a method preferably so that a separation processing time during being penetrated with the separation means 200 (the time of operation indicated by arrow (2)) and a time from being removed with the separation means 200 to being penetrated again into the fiber bundle (the time of operation indicated by arrows (3), (4) and (1)) are controlled. In this examples, the moving direction of the separation means 200 is the repetition of (1) to (4) in the figure.

Further, when the fiber bundle 100 is not moved and the separation processing is performed while moving the separation means 200 until the separation means 200 passes through the entanglement accumulation part 120, as shown in FIG. 4(B), the control is performed in another method preferably so that a separation processing time during being penetrated with the separation means 200 (the time of operation indicated by arrow (2) or arrow (6)) and a time from being removed with the separation means 200 to being penetrated again into the fiber bundle (the time of operation indicated by arrows (3), (4) and (5) or by arrows (3), (4) and (1)) are controlled. Also in this example, the moving direction of the separation means 200 is the repetition of (1) to (4) in the figure.

Thus, by the separation means 200, the separation-processed sections and the not-separated-processed sections are alternatively formed, and it is preferred that a partially separated fiber bundle is produced so that the not-separation-processed sections have a ratio within a predetermined range with respect to the total length of the fiber bundle.

Depending upon the entanglement state of single fibers forming the fiber bundle 100, without securing a not-separation-processed section having an arbitrary length (for example, in FIG. 2, after creating the separation-processed section 110, creating a next separation-processed part 150 with securing a not-separation-processed section 130 having a constant length), it is possible to restart separation processing subsequently from the vicinity of the terminal end portion of the separation-processed section. For example, as shown in FIG. 4(A), when the separation processing is performed while intermittently moving the fiber bundle 100, after the separation means 200 performs the separation processing (arrow (2)), by setting the moving length of the fiber bundle 100 to be shorter than the length of the separation processing performed immediately before, the position (arrow (1)) where the separation means 200 is to be penetrated once again can be overlapped with the separation-processed section performed with the separation processing immediately before. On the other hand, as shown in FIG. 4(B), in carrying out the separation processing while moving the separation means 200 itself, after once removing the separation means 200 (arrow (3)), without moving it at a constant length (arrow (4)), the separation means 200 can be penetrated into the fiber bundle again (arrow (5)).

In such a separation processing, when a plurality of single fibers forming the fiber bundle 100 are interlaced with each other, since the single fibers are not substantially aligned in the fiber bundle, even if the separation means 200 is penetrated at the same position as the position where the separation processing has been already performed or as the position where the separation means 200 has been removed, in the width direction of the fiber bundle 100, the position to be penetrated is easily shifted with respect to the single fiber level, and the separation processed state (gap) is not continued from the separation-processed section formed immediately before and they can exist as separation-processed sections different from each other.

The length of the separation-processed section obtained per one separation processing (separation distance 170) is preferably 30 mm or more and less than 1,500 mm, although it depends upon the entanglement state of single fibers of the fiber bundle performed with the separation processing. If it is less than 30 mm, the effect according to the separation processing is insufficient, and if it is 1,500 mm or more, depending upon the reinforcing fiber bundle, there is a possibility of occurrence of yarn breakage or fluffing.

Further, when a plurality of separation means 200 are provided, it is also possible to provide a plurality of alternately formed separation-processed sections and not-separation-processed sections approximately parallel to each other with respect to the width direction of the fiber bundle. In this example, as aforementioned, it is possible to arbitrarily dispose a plurality of projected parts 210 by arranging a plurality of separation means 200 in parallel, staggeringly, in shifted phases or the like.

Furthermore, each of the plurality of projected parts 210 can also be controlled independently. It is also preferred that the individual projected parts 210 independently perform separation processing by the time required for the separation processing or the pressing force detected by the projected part 210.

In any case, the fiber bundle is unwound from an unwinding device (not shown) or the like disposed on the upstream side in the fiber bundle traveling direction for unwinding the fiber bundle. As the unwinding direction of the fiber bundle, although a laterally unwinding system for pulling out in a direction perpendicular to the axis of rotation of a bobbin and a longitudinally unwinding system for pulling out in the same direction as the axis of rotation of the bobbin (paper tube) are considered, the laterally unwinding system is preferred in consideration that in that system there are few unwinding twists.

Further, with respect to the installation posture of the bobbin at the time of unwinding, it can be installed in an arbitrary direction. In particular, when, in a state where the bobbin is pierced through the creel, the end surface of the bobbin on the side not being the creel rotation shaft fixed surface is directed in a direction other than the horizontal direction, it is preferred that the fiber bundle is held in a state where a constant tension is applied to the fiber bundle. When there is no constant tension in the fiber bundle, it is considered that the fiber bundle falls from and is separated from a package (a winding body in which the fiber bundle is wound on the bobbin), or that a fiber bundle separated from the package winds around the creel rotation shaft, whereby unwinding becomes difficult.

Further, as a method of fixing the rotation shaft of the unwound package, in addition to the method of using a creel, a surface unwinding method is also applicable wherein a package is placed on two rollers arranged in parallel with each other at a state in parallel with the two parallel rollers, and the package is rolled on the arranged rollers to unwind a fiber bundle.

Further, in unwinding using a creel, a method of applying a tension to the unwound fiber bundle by applying a brake to the creel by putting a belt around the creel, fixing one end of the belt, and hanging the weight or pulling with a spring at the other end or the like, is considered. In this example, varying the braking force depending upon the winding diameter is effective as means of stabilizing the tension.

Furthermore, for adjustment of the number of single fibers after separation processing, a method of widening the fiber bundle and a method for adjustment by a pitch of a plurality of separation means arranged in the width direction of the fiber bundle can be employed. By making the pitch of the separation means smaller and providing a larger number of separation means in the width direction of the fiber bundle, it becomes possible to perform a so-called thin bundle separation processing into thin bundles each having fewer single fibers. Further, it is also possible to adjust the number of single fibers even by widening the fiber bundle before separation processing and applying separation processing to the widened fiber bundle with a larger number of separation means without narrowing the pitch of the separation means.

The term "widening" means a processing of expanding the width of the fiber bundle 100. The widening method is not particularly restricted, and it is preferred to use a vibration widening method of passing through a vibration roll, an air widening method of blowing compressed air or the like.

The separation-processed part 150 is formed by repeating penetration and removal of the separation means 200. At that time, it is preferred to set the timing of penetrating again by the time passed after removing the separation means 200. Further, also it is preferred to set the timing of removing again by the time passed after penetrating the separation means 200. By setting the timing of penetrating and/or removing by time, it becomes possible to create the separation-processed section 110 and the not-separation-processed section 130 at predetermined distance intervals, and it also becomes possible to arbitrarily determine the ratio between the separation-processed section 110 and the not-separation-processed section 130. Further, although the predetermined time intervals may be always the same, it is also possible to change the intervals in accordance with circumstances such as increasing or shortening the intervals depending upon the distance at which the separation processing has been progressed, or changing the intervals depending upon the state of the fiber bundle at respective times, for example, shortening the predetermined time intervals when there is little fluffing or entanglement of single fibers in the original fiber bundle or the like.

When the separation means 200 is penetrated into the fiber bundle 100, since the created entangled part 160 continues to press the projected part 210 in accordance with the progress of the separation processing, the separation means 200 receives a pressing force from the entangled part 160.

As aforementioned, a plurality of single fibers are not substantially aligned in the fiber bundle 100 but in most portions they are interlaced with each other at the single fiber level, and further, in the lengthwise direction of the fiber bundle 100, there is a possibility where there exist a portion with many entanglements and a portion with few entanglements. In the portion with many entanglements of single fibers, the rise of the pressing force at the time of separation processing becomes fast, and conversely, in the portion with few entanglements of single fibers, the rise of the pressing force becomes slow. Therefore, it is preferred that the separation means 200 is provided with a pressing force detection means for detecting a pressing force from the fiber bundle 100.

Further, since the tension of the fiber bundle 100 may change before and after the separation means 200, at least one tension detection means for detecting the tension of the fiber bundle 100 may be provided in the vicinity of the separation means 200, or a plurality of them may be provided and a difference in tension may be calculated. These means for detecting the pressing force, the tension and the tension difference may be provided individually, or may be provided in a form of any combination thereof. The tension detection means for detecting the tension is disposed preferably 10 to 1,000 mm apart from the separation means 200 in at least one of the front and rear of the fiber bundle 100 along the lengthwise direction of the fiber bundle 100.

It is preferred that removal of the separation means 200 is controlled in accordance with each detected value of these pressing force, tension and tension difference. It is further preferred to control removing the separation means 200 when the detected value exceeds an arbitrarily set upper limit value accompanying with the rise of the detected value. In the pressing force and the tension, it is preferred to set the upper limit value to 0.01 to 1 N/mm, and in the tension difference to 0.01 to 0.8 N/mm. The upper limit value may be varied within a range of ±10% depending upon the state of the fiber bundle. The unit (N/mm) of the pressing force, the tension and the tension difference indicates force acting per the width of the fiber bundle 100.

If lowering than the range of the upper limit value of the pressing force, the tension or the tension difference, because immediately after penetrating the separation means 200 the pressing force, the tension or the tension difference reaches a value to be removed with the separation means 200, a sufficient separation processing distance cannot be obtained, the separation-processed section 110 becomes too short and, therefore, the fiber bundle performed with partial separation processing tried to be obtained cannot be obtained. On the other hand, if exceeding the range of the upper limit value, because after penetrating the separation means 200 cutting of the single fibers in the fiber bundle 100 increases before the pressing force, the tension or the tension difference reaches a value to be removed with the separation means 200, defects such as projecting of the fiber bundle having been performed with partial separation processing in a shape like a split end or increase of generated fluffs, are likely to occur. The projected split end may be wrapped around a roll being served to the conveyance, or the fluffs are accumulated on a drive roll to cause slipping in the fiber bundle, and the like, and thus, a conveyance failure tends to be caused.

Different from when the timing of removal of the separation means 200 is controlled with time, in detecting the pressing force, the tension and the tension difference, because the separation means 200 is removed before a force enough to cut the fiber bundle 100 is applied during the partial separation processing, an unreasonable force is not applied to the fiber bundle 100, and continuous separation processing becomes possible.

Furthermore, to obtain the fiber bundle 100 having a long separation-processed section 110 and a stable shape of the entanglement accumulation part 120 in the lengthwise direction, while suppressing the occurrence of branching or fluffing like a partial cutting of the fiber bundle 100, it is preferred that the pressing force is controlled to 0.04 to 0.4 N/mm, the tension is controlled to 0.02 to 0.2 N/mm, and the tension difference is controlled to 0.05 to 0.5 N/mm.

It is also preferred to provide an imaging means for detecting the presence of a twist of the fiber bundle 100 at 10 to 1,000 mm in at least one of the front and rear of the fiber bundle 100 along the lengthwise direction of the fiber bundle 100 from the separation means 200 having been penetrated into the fiber bundle 100. By this imaging, the position of the twist is specified beforehand, and it is controlled to not penetrate the separation means 200 into the twist, thereby making it possible to prevent a mistake in penetration. Further, by removing the separation means 200 when the twist approaches the penetrated separation means 200, that is, by controlling to not penetrate the separation means 200 into the twist, it is possible to prevent narrowing in width of the fiber bundle 100. A mistake in penetration means that the separation means 200 is penetrated into the twist, the fiber bundle 100 is only pushed and moved in the penetrating direction of the separation means 200, and the separation processing is not performed.

In a configuration in which a plurality of separation means 200 are present in the width direction of the fiber bundle 100 and are arranged at equal intervals, if the width of the fiber bundle 100 varies, because the number of single fibers having been performed with separation processing also varies, there is a possibility that a separation processing with a stable number of single fibers cannot be performed. Further, if the twist is forcibly performed with separation processing, because the fiber bundle 100 is cut at the single fiber level to generate a large amount of fluffs, the shape of the entanglement accumulation part 120 in which the entangled parts 160 are accumulated becomes large. If the large entanglement accumulation part 120 is left, it is easily caught by the fiber bundle 100 unwound from the roll.

When the twist of the fiber bundle 100 is detected, other than the above-described control to not penetrate the separation means 200 into the twist, the traveling speed of the fiber bundle 100 may be changed. Concretely, after the twist is detected, the traveling speed of the fiber bundle 100 is increased at the timing when the separation means 200 is being removed from the fiber bundle 100 until the twist passes through the separation means 200, thereby efficiently avoiding the twist.

Further, an image calculation processing means for calculating the image obtained by the imaging means may be further provided, and a pressing force control means for controlling the pressing force of the separation means 200 based on the calculation result of the image calculation processing means may be further provided. For example, when the image calculation processing means detects a twist, it is possible to improve the passing ability of the twist when the separation means passes the twist. Concretely, it is preferred to detect the twist by the imaging means and control the separation means 200 so that the pressing force is decreased from just before the projected part 210 comes into contact with the detected twist to the time when the projected part 210 passes therethrough. When the twist is detected, it is preferred to reduce it to 0.01 to 0.8 time the upper limit value of the pressing force. When it is below this range, substantially the pressing force cannot be detected, it becomes difficult to control the pressing force, or it becomes necessary to enhance the detection accuracy of the control device itself. Further, when it exceeds this range, the frequency of the separation processing performed to the twist is increased and the fiber bundle becomes narrow.

It is also preferred to use a rotatable separation means 220 rotatable as the separation means other than simply penetrating the separation means 200 having the projected part 210 into the fiber bundle 100. FIG. 5 is an explanatory view showing an example of a movement cycle in which a rotatable separation means is penetrated. The rotatable separation means 220 has a rotation mechanism having a rotation axis 240 orthogonal to the lengthwise direction of the fiber bundle 100, and the projected part 210 is provided on the surface of the rotation shaft 240. As the fiber bundle 100 travels along the fiber bundle running direction B (arrow) in the figure, the projected parts 210 provided in the rotatable separation means 220 are penetrated into the fiber bundle 100 and the separation processing is started. Although omitted in the figure, it is preferred that the rotatable separation means 220 has a pressing force detection mechanism and a rotation stop position holding mechanism. Until a predetermined pressing force acts on the rotatable separation means 220 by the both mechanisms, the rotation stop position is maintained at the position shown in FIG. 5(A) and the separation processing is continued. When exceeding the predetermined pressing force, for example, when an entangled part 160 is caused at the position of the projected part 210, the rotatable separation means 220 starts to rotate as shown in FIG. 5(B). Thereafter, as shown in FIG. 5(C), the projected part 210 (black circle mark) is removed from the fiber bundle 100, and the next projected part 210 (white circle mark) is penetrated into the fiber bundle 100. The shorter the operation shown in FIGS. 5(A) to 5(C) is, the shorter the not-separation-processed section becomes and, therefore, in case where it is attempted to increase the proportion of separation-processed sections, it is preferred to shorten the operation shown in FIGS. 5(A) to 5(C).

By arranging the projected parts 210 more in the rotatable separation means 220, it is possible to obtain a fiber bundle 100 with a high proportion of separation processing and to extend the life of the rotatable separation means 220. A fiber bundle with a high proportion of separation processing means a fiber bundle obtained by lengthening the separation-processed length within the fiber bundle, or a fiber bundle in which the frequency of occurrence of the separation-processed sections and the not-separation-processed sections is increased. Further, as the number of the projected parts 210 provided in one rotatable separation means increases, the lifetime can be lengthened by reducing the frequency of contact of the projected parts 210 with the fiber bundle 100 and wear of the projected parts 210. As for the number of projected parts 210 to be provided, it is preferred to arrange 3 to 12 pieces at equal intervals on the disk-shaped outer edge, more preferably 4 to 8 pieces.

Thus, when attempting to obtain a fiber bundle 100 with a stable fiber bundle width while giving priority to the proportion of separation processing and the life of the projected parts, it is preferred that the rotatable separation means 220 has an imaging means for detecting a twist. Concretely, during normal operation until the imaging means detects the twist, the rotatable separation means 220 intermittently repeats the rotation and the stop to perform the separation processing, and when the twist is detected, the rotational speed of the rotatable separation means 220 is increased from the speed at the normal time and/or the stop time is shortened, thereby stabilizing the fiber bundle width.

It is also possible to control the stop time to zero, that is, to continue the rotation without stopping.

Further, other than the method for repeating the intermittent rotation and stopping of the rotatable separation means 220, the rotatable separation means 220 may always continue to rotate. At that time, it is preferred to make either one of the traveling speed of the fiber bundle 100 and the rotational speed of the rotatable separation means 220 relatively faster or slower. When the speeds are the same, although separation-processed sections can be formed because the operation of penetrating/removing the projected part 210 into/from the fiber bundle 100 is performed, since the separation processing operation acting on the fiber bundle 100 is weak, there is a possibility that the separation processing is not be performed sufficiently. Further, when any one of the speeds is too fast or too slow, the number of times the fiber bundle 100 and the projected parts 210 come in contact with each other increases, there is a possibility that yarn breakage may occur due to rubbing, which causes to be inferior in continuous productivity.

In the partial separation step, a reciprocating movement mechanism to perform the penetrating and removing of the separation means 200 or the rotatable separation means 220 by reciprocating movement of the separation means 200 or the rotatable separation means 220 may be further provided. Further, it is also preferred to further provide a reciprocating movement mechanism to reciprocate the separation means 200 and the rotatable separation means 220 along the feed direction of the fiber bundle 100. For the reciprocating movement mechanism, it is possible to use a linear motion actuator such as a compressed-air or electric cylinder or slider.

Next, a cutting step [B] in the method of producing a separated fiber bundle (a step of cutting a not-separation-processed part of the partially separated fiber bundle formed in the above-described partial separation step [A] along the lengthwise direction of the fiber bundle (in a direction along the lengthwise direction of the fiber bundle)) will be explained.

FIG. 6 shows an example of a cutting step [B], and shows (A) a schematic plan view of a partially separated fiber bundle and (B) a schematic plan view of a separated fiber bundle manufactured from the partially separated fiber bundle by the cutting step. In the cutting step [B], as shown in FIG. 6(A), the not-separation-processed part 190 of the partially separated fiber bundle 180 formed in the partial separation step [A] is cut along the cutting part 300 of the not-separation-processed part 190 shown in the figure. For example, a cutting means 400 (for example, means comprising a sharp plate-like blade capable of proceeding to cut the not-separation-processed part 190, differently from the aforementioned projected part 210) is inserted into each of a plurality of separation-processed parts 150 formed in parallel to each other in the partially separated fiber bundle 180, the partially separated fiber bundle 180 is traveled, or the cutting means 400 is moved relatively to the partially separated fiber bundle 180, and the not-separation-processed part 190 is cut along the cutting part 300.

In inserting the cutting means 400 into the separation-processed part 150, the positions of the separation-processed part 150 and the cutting means 400 inserted thereinto may approximately coincide to each other, and the cutting means 400 may proceed with cutting the not-separation-processed part 190 along the cutting part 300, and the cut-off part may be able to join the following separation-processed part 150.

When the not-separation-processed part 190 of the partially separated fiber bundle 180 is cut along the cutting part 300 by the cutting means 400, as shown in FIG. 6(B), a plurality of completely divided fiber bundles 301 are obtained, and the bundles of these divided fiber bundles 301 are to be manufactured as the separated fiber bundle 10. The separated fiber bundle 10 obtained through such a cutting step [B] is wound, for example, for each of the divided fiber bundles 301 (winding step [C]). However, with respect to winding up the separated fiber bundle 10, it is also possible to wind all the divided fiber bundles 301 by the lump, and it is also possible to wind every group of a plurality of divided fiber bundles 301 adequately grouped.

Further, in the method of producing a separated fiber bundle, the above-described cutting step [B] can also be regarded as an additional separation step performed with an additional separation processing along the lengthwise direction of the fiber bundle, performed for the not-separation-processed part 190 of the partially separated fiber bundle 180 formed in the aforementioned partial separation step [A].

In this additional separation step, for example, as a substitute for the cutting means 400 used in the above-described cutting step [B], a separation means 200 as used in the aforementioned step [A] is inserted into the separation-processed part 150, and the additional separation processing can be performed with respect to the cutting part 300 of the not-separation-processed part. In this insertion of the separation means 200 into the separation-processed part 150, similarly to in the above-described step [B], the separation means 200 may separate the not-separation-processed part 190 along the cutting part 300, and it may be additionally separated so that the separated part is joined to the following separation-processed part 150.

When the not-separated-processed part 190 of the partially separated fiber bundle 180 is cut along the cutting part 300 by the separation means 200, similarly in the case of passing through the above-described step [B], as shown in FIG. 6(B), a plurality of completely divided fiber bundles 301 are obtained, and the bundle of these divided fiber bundles 301 is to be manufactured as the separated fiber bundle 10.

Thus, in the method, since the aforementioned partial separation step [A] is carried out first and the not-separation-processed part 190 of the partially separated fiber bundle 180 formed in the partial separation step [A] is cut in the cutting step [B] (concept including the above-described additional processing) is performed to manufacture the completely divided fiber bundles 301, as aforementioned, compared to conventional technologies where a separation processing is performed by longitudinally slitting a fiber bundle of a large tow abruptly and continuously using a slitter or the like, it becomes possible to suppress the cutting processing in the cutting step to a minimum, and the risk of occurrence of process troubles and the frequency of exchange of a cutting blade can be greatly reduced, whereby the productivity can be greatly improved.

Further, in the cutting step [B], the entangled part 160 and the like generated in the partial separation step [A] previously performed can fulfill the role of adhesion point and the like, whereby the bundle shape retention property can be kept high. Also from this viewpoint, excellent process stability and high productivity can be obtained.

In the method of producing a separated fiber bundle, in the cutting step [B], after subjecting the partially separated fiber bundle to a widening processing, the not-separation-processed part thereof can be cut along the lengthwise direction of the fiber bundle. For example, as shown in FIG. 7, with respect to the partially separated fiber bundle 180 before widening processing formed in the previously performed partial separation processing [A] as shown in FIG. 7(A) which has the entanglement accumulation part 120 and the like and in which the separation-processed part 150 and the not-separation-processed part 190 are alternately formed, as shown in FIG. 7(B), widening processing is performed thereto, and for the partially separated fiber bundle 180 after the widening processing, the cutting processing similar to the aforementioned processing can be performed. Although the cutting means 400 for the not-separation-processed part is inserted into the separation-processed part 150*a* expanded by the widening processing, since the separation-processed part 150*a* is widened, it becomes easy to penetrate the cutting means 400, and the penetrating operation of the cutting means 400, and the subsequent cutting operation along the cutting part 300, are facilitated. Therefore, the process stability and the productivity are further enhanced. There is no particular restriction on the method of widening processing, although exemplified are a method for pressing a widening roller onto a partially separated fiber bundle, a vibration widening method of passing through a vibration roll, an air widening method of blowing compressed air, or the like, from the viewpoint of accurately penetrating the cutting means into the separation-processed part, it is more preferred to employ a "static" type manner such as pressing the widening roller than the so-called "dynamic" type which gives a vibration to the partially separated fiber bundle such as the above-described vibration widening method and the air widening method. As the widening roller, for example, exemplified is a so-called inverted hand drum shaped one in which the cross-sectional area at the center of the column is larger than the cross-sectional area at both ends.

Next, the fiber-reinforced resin molding material will be explained.

The fiber-reinforced resin molding material contains a reinforcing fiber mat obtained by cutting/spraying the above-described separated fiber bundle and a matrix resin.

The average fiber length of the cut-off separated fiber bundle is preferably 5 to 100 mm, and more preferably 10 to 80 mm. Further, the distribution of the fiber length may be a distribution of a single-kind fiber length or a mixture of two or more kinds.

Further, the matrix resin is not particularly restricted, and any of a thermosetting resin and a thermoplastic resin can be used, and it can be appropriately selected within a range that does not greatly deteriorate the mechanical properties as a molded article. For example, in a thermosetting resin, a vinyl ester resin, an epoxy resin, an unsaturated polyester resin, a phenol resin, an epoxy acrylate resin, a urethane acrylate resin, a phenoxy resin, an alkyd resin, a urethane resin, a maleimide resin, a cyanate resin or the like can be used. Among them, any one of vinyl ester resin, epoxy resin, unsaturated polyester resin, phenol resin, or a mixture thereof is preferred. Further, in a thermoplastic resin, polyolefin-based resins such as polyethylene resin and polypropylene resin, polyamide-based resins such as nylon 6 resin and nylon 6,6 resin, polyester-based resins such as polyethylene terephthalate resin and polybutylene terephthalate resin, a polyphenylene sulfide resin, a polyether ketone resin, a polyether sulfone resin, an aromatic polyamide resin or the like can be used. Among them, any one of a polyamide resin, a polypropylene resin and a polyphenylene sulfide resin is preferred. A thermosetting resin can be used more preferably from the viewpoint of impregnating property of the matrix resin and applicability to the impregnating step.

Figure 8:
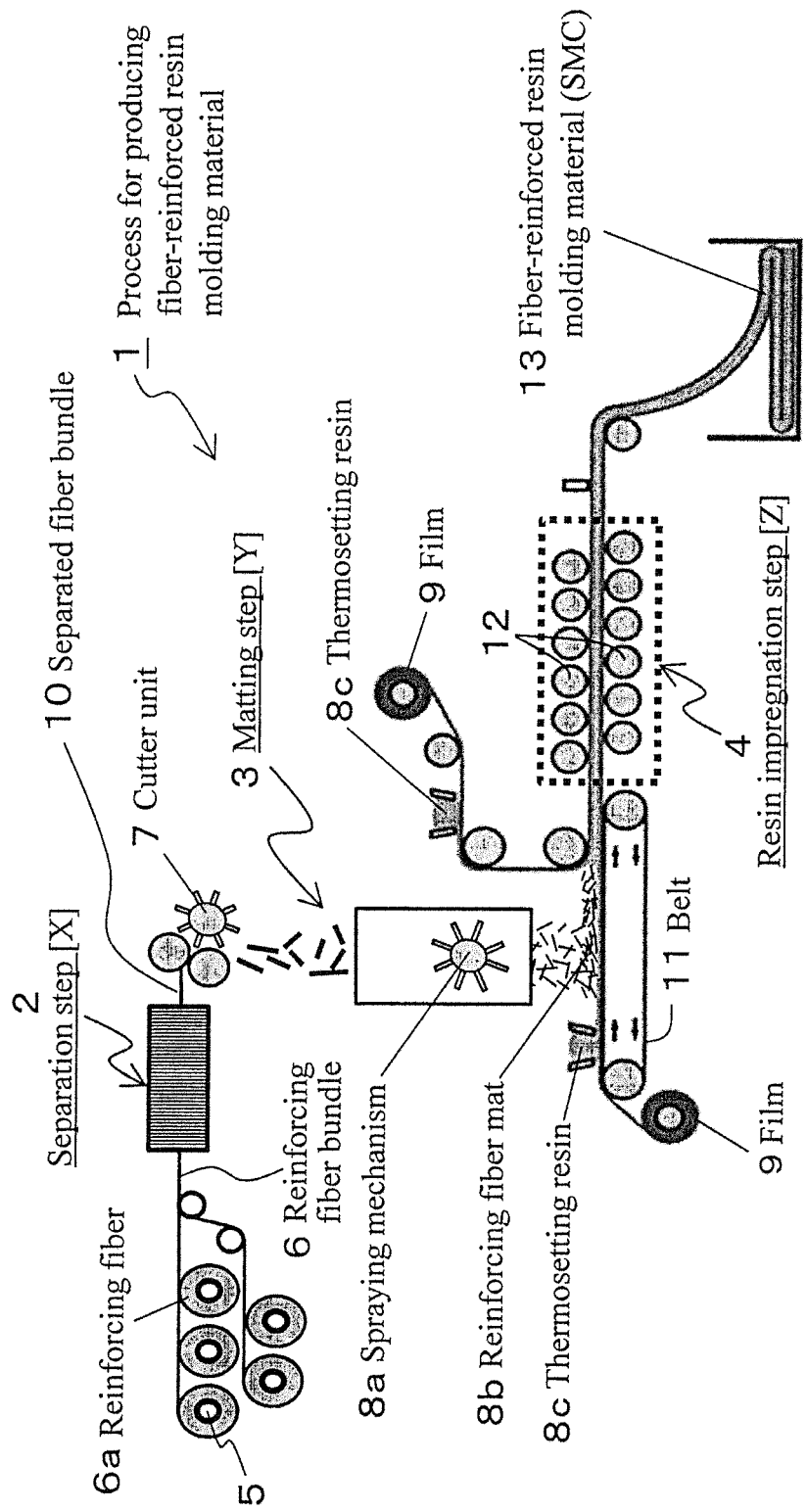
FIG. 8 is a schematic diagram showing a method of producing a fiber-reinforced resin molding material according to an example.

FIG. 8 shows a method for producing a fiber-reinforced resin molding material according to an example.

In FIG. 8, symbol 1 denotes the whole of a process of producing a fiber-reinforced resin molding material containing at least a reinforcing fiber mat and a matrix resin, wherein the production process 1 comprises at least a separation step [X] 2 of obtaining a separated fiber bundle by a method in which after obtaining a partially separated fiber bundle in which separation-processed parts separated into a plurality of bundles and not-separation-processed parts are alternately formed along the lengthwise direction of the reinforcing fiber bundle comprising a plurality of single fibers, the not-separation-processed parts are cut along the lengthwise direction of the fiber bundle and/or additionally separated, and a matting step [Y] 3 of obtaining a reinforcing fiber mat 8*b* by cutting the separated fiber bundle 10 and spraying the cut bundles, and a resin impregnation step [Z] 4 in which the reinforcing fiber mat 8*b* is impregnated with a matrix resin (thermosetting resin 8*c* in this example).

A reinforcing fiber bundle 6 composed of reinforcing fibers 6*a* of a plurality of single fibers fed out from a plurality of creels 5 is supplied to the separation step [X] 2, separation processing is carried out in the step 2 as aforementioned, the separated fiber bundle 10 is manufactured.

The manufactured separated fiber bundle 10 is subsequently (continuously) supplied to the matting step [Y] 3, where it is cut into discontinuous fiber bundles by a cutter unit 7 in the step 3 and, thereafter, the cut bundles are sprayed through a spraying mechanism 8*a*, for example, on a belt 11 being circulated, such that a reinforcing fiber mat 8*b* is formed. This reinforcing fiber mat 8*b* is impregnated with a thermosetting resin 8*c* as a matrix resin, and in this example, the resin impregnation in the resin impregnation step [Z] 4 is accelerated by such a manner that the reinforcing fiber mat 8*b* and the supplied thermosetting resin 8*c* to be impregnated are nipped films 9 sequentially supplied to both upper and lower sides of the reinforcing fiber mat 8*b*, and at the nipped state, they are pressed, for example, between a plurality of resin impregnation rollers 12. The reinforcing fiber mat 8*b* impregnated with the matrix resin is folded as shown in the figure or wound as a continuous sheet-like fiber-reinforced resin molding material 13 and, thus, a series of continuous fiber-reinforced resin molding material production process 1 is completed. The fiber-reinforced resin molding material 13 is produced, for example, as a sheet molding compound (SMC).

Thus, since first a separated fiber bundle 10 is manufactured, the separated fiber bundle 10 is cut and sprayed to prepare a reinforcing fiber mat 8*b* derived from the separated fiber bundle, and thereinto the matrix resin 8*c* is impregnated to obtain the fiber-reinforced resin molding material 13, when cutting and spraying the separated fiber bundle 10 to prepare the reinforcing fiber mat 8*b* as an intermediate base material of fiber bundles of discontinuous fibers, it becomes possible to make it with fiber bundles adjusted at an arbitrary optimal number of single fibers, and in the fiber-reinforced resin molding material 13 impregnated with matrix resin 8*c* thereinto, it becomes possible to exhibit the flowability during molding and the mechanical properties of a molded article at a good balance.

In particular, in the manufacturing process of the separated fiber bundle 10, as described above, the fiber bundle can be stably slit continuously, and the separated fiber bundle 10 in an optimum form can be easily and efficiently produced. Especially, even in a fiber bundle containing twist or a fiber bundle of a large tow having a large number of single fibers, a continuous slit processing becomes possible without worrying about exchange life of a rotary blade. In addition, a continuous slit processing of an inexpensive large tow becomes possible, whereby it may become possible to reduce the material cost and production cost of a finally molded article.

From the viewpoint that it is possible to produce a desired fiber-reinforced resin molding material 13 efficiently, smoothly, and with excellent productivity in the above-described production process 1 of the fiber-reinforced resin molding material, an example is shown as a preferred example wherein a series of the steps [X] to [Z] are carried out continuously in one process, but it is not necessary to continuously carry out the series of the steps [X] to [Z] in one process, for example, the separated fiber bundle obtained through the step [X] may be wound up once and then subjected to the step [Y].

Figure 9:
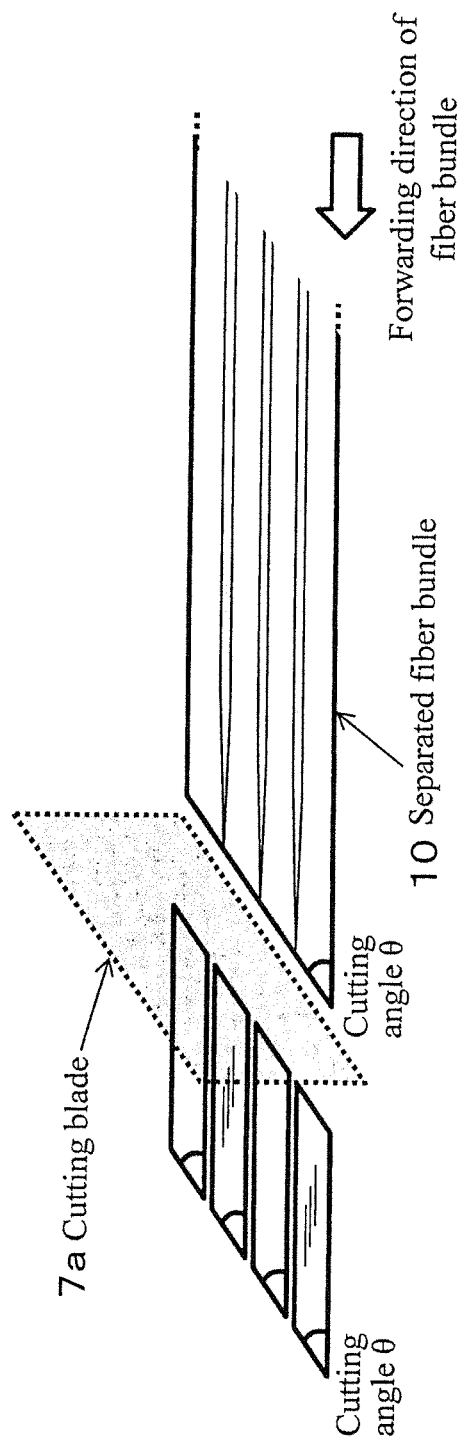
FIG. 9 is a schematic perspective view showing an example of obliquely cutting a separated fiber bundle with respect to its lengthwise direction.

Further, when cutting the separated fiber bundle 10 in the matting step [Y] 3 as shown in FIG. 8, it is also preferred to cut the separated fiber bundle 10 at an angle θ (0<θ≤90°) with respect to the lengthwise direction of the fiber bundle 10. For example, as shown in FIG. 9, with a cutting blade 7a inclined at an angle θ (0<θ≤90°) (in this example, in particular, inclined at an angle θ (0<θ<90°) with respect to the lengthwise direction of the separated fiber bundle 10 (running direction of the fiber bundle in the figure), the separated fiber bundle 10 is cut. In a fiber-reinforced resin molding material using such a mat, it becomes possible to particularly improve the mechanical properties of a molded article.

INDUSTRIAL APPLICABILITY

Our method can be applied to the separation of any fiber bundle in which it is desired to separate a fiber bundle comprising a plurality of single fibers into two or more thin bundles with excellent process stability and productivity. The obtained separated fiber bundle can be used for any reinforcing fiber composite material by being impregnated with a matrix resin.

The invention claimed is:

1. A method of producing a separated fiber bundle, comprising at least steps [A] and [B] are performed in this order:
   [A] a partial separation step of obtaining a partially separated fiber bundle in which separation-processed parts, each separated into a plurality of completely divided fiber bundles, and not-separation-processed parts are alternately formed along the lengthwise direction of a fiber bundle comprising a plurality of single fibers; and
   [B] a cutting step of cutting the not-separation-processed parts of the partially separated fiber bundle formed in the step [A] along the lengthwise direction of the fiber bundle,
   wherein, in the step [B], after performing a widening processing to the partially separated fiber bundle, the not-separated-processed part is cut along the lengthwise direction of the fiber bundle.

2. The method according to claim 1, wherein in the step [B], over the entire length of a not-separation-processed part located between ends of the separation-processed parts adjacent to each other in the lengthwise direction of the partially separated fiber bundle formed in the step [A], the not-separation-processed part is cut along the lengthwise direction of the fiber bundle.

3. The method according to claim 1, wherein, in the step [A], the partially separated fiber bundle is obtained such that, while a fiber bundle comprising a plurality of single fibers travels along the lengthwise direction of the fiber bundle, a separation means provided with a plurality of projected parts is penetrated into the fiber bundle to create a separation-processed part, and entangled parts, where the single fibers are interlaced, are formed at contact parts with the projected parts in at least one separation-processed part, thereafter the separation means is removed from the fiber bundle, and after passing through an entanglement accumulation part including the entangled parts, the separation means is penetrated again into the fiber bundle.

4. The method according to claim 1, wherein, in the step [A], the partially separated fiber bundle is obtained such that a separation means provided with a plurality of projected parts is penetrated into a fiber bundle comprising a plurality of single fibers, while the separation means travels along the lengthwise direction of the fiber bundle, a separation-processed part is created, and entangled parts, where the single fibers are interlaced, are formed at contact parts with the projected parts in at least one separation-processed part, thereafter the separation means is removed from the fiber bundle, and after the separation means is traveled up to a position passing through an entanglement accumulation part including the entangled parts, the separation means is penetrated again into the fiber bundle.

5. The method according to claim 1, further comprising step [C]:
   [C] a winding step of winding a separated fiber bundle completely separated in the step [B].

6. A method of producing a fiber reinforced resin molding material comprising a matrix resin and a reinforcing fiber mat obtained by cutting the separated fiber bundle obtained by the production method according to claim 1 in a direction crossing the separated fiber bundle and spraying the cut fiber bundles, the method comprising steps [Y]-[Z]:
   [Y] a matting step of obtaining a reinforcing fiber mat by cutting the separated fiber bundle in a direction crossing the separated fiber bundle and spraying the cut fiber bundles of the reinforcing fiber mat; and
   [Z] a resin impregnation step of impregnating a matrix resin into the reinforcing fiber mat.

7. The method according to claim 6, wherein the separated fiber bundle in the step [Y] is obtained by once winding the separated fiber bundle obtained in claim 1 and then unwinding.

8. The method according to claim 6, wherein at least the steps [Y] to [Z] are carried out continuously in a single process.

9. The method according to claim 6, wherein, in the step [Y], the separated fiber bundle is cut at an angle θ (0<θ≤90°) with respect to the lengthwise direction thereof.

* * * * *